April 5, 1949.        G. J. MORGAN        2,466,258
BURNER FOR LIQUID FUEL
Filed May 29, 1943        2 Sheets-Sheet 1
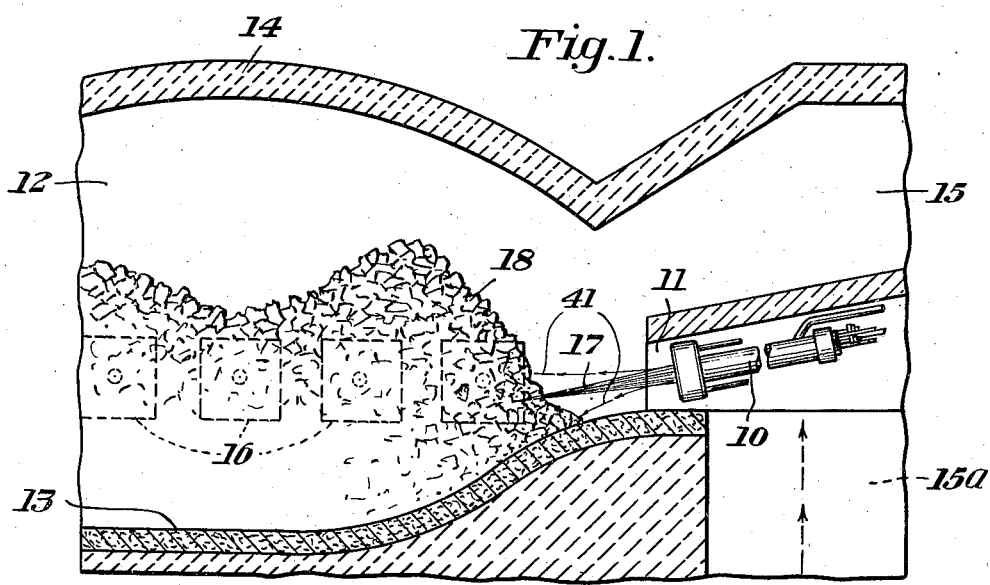
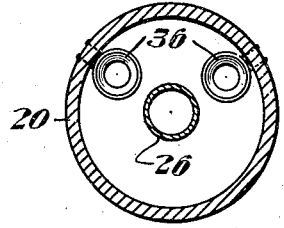
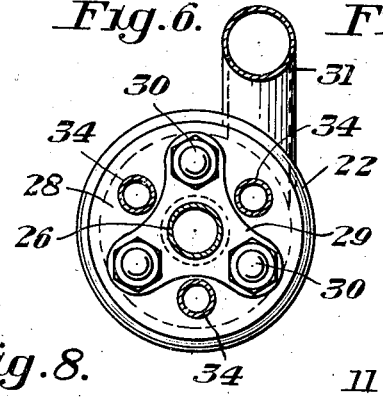
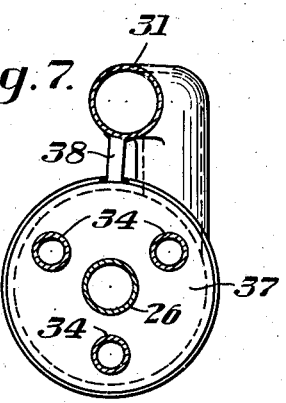
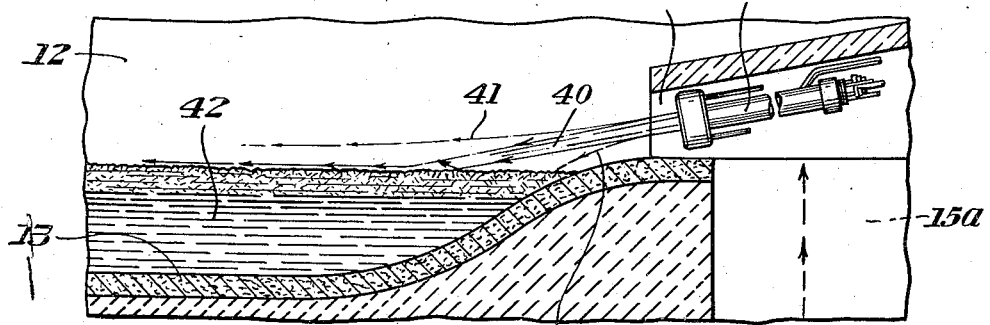
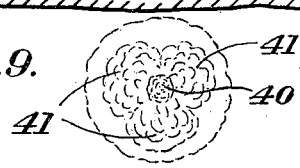
INVENTOR
Guy J. Morgan
by his attorneys
Stebbins and Blenko

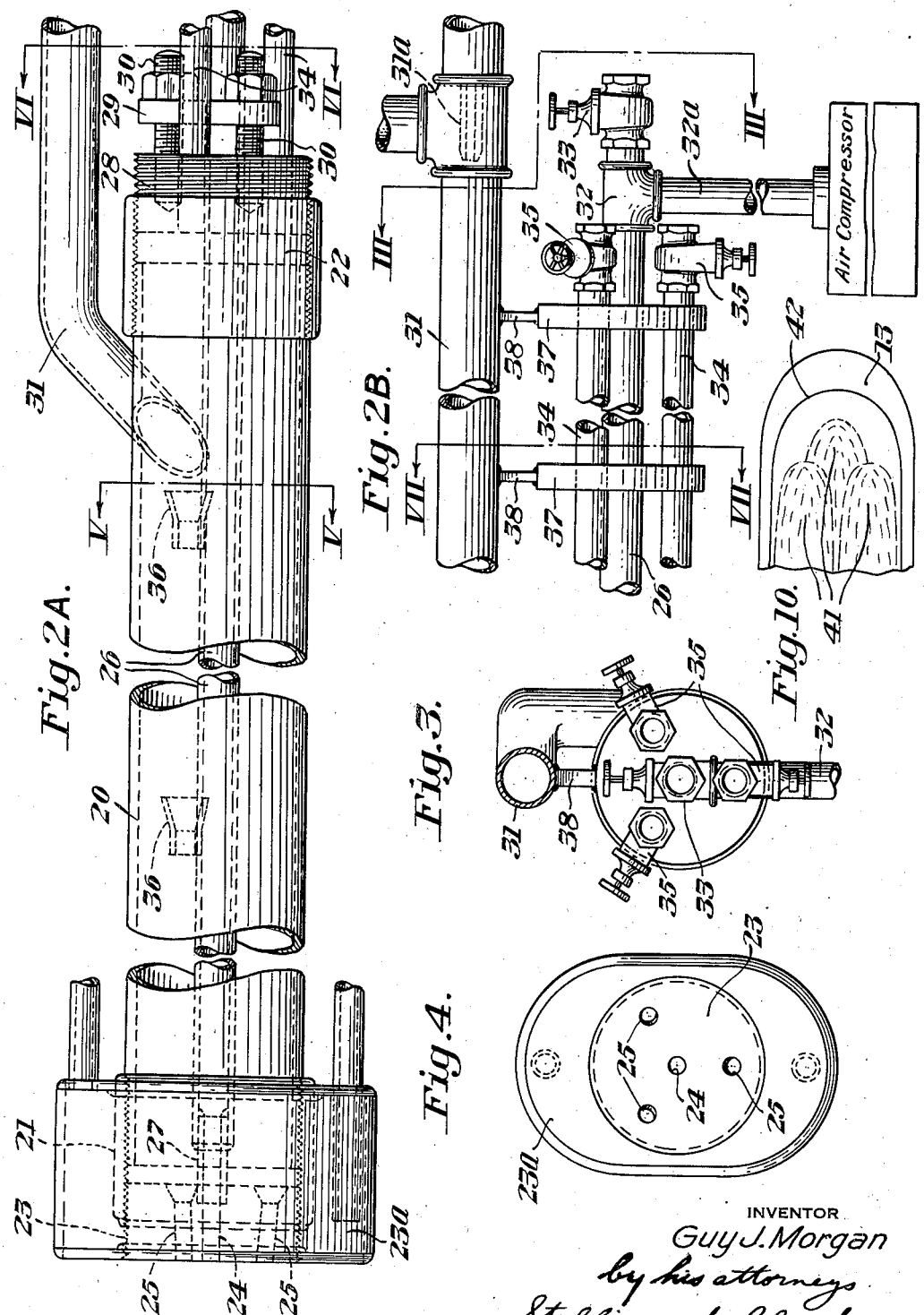

Patented Apr. 5, 1949

2,466,258

UNITED STATES PATENT OFFICE 2,466,258

BURNER FOR LIQUID FUEL

Guy J. Morgan, Poland, Ohio

Application May 29, 1943, Serial No. 488,975

3 Claims. (Cl. 158—74)

This invention relates to a burner for liquid fuel particularly suited for the heating of the charge in an open-hearth furnace.

This is a continuation-in-part of my application Serial No. 438,704, filed April 13, 1942, now Patent No. 2,362,085, November 7, 1944, for Method of heating an open-hearth furnace charge and burner therefor.

Various types of fuels have been employed heretofore for heating open-hearth furnace charges. While gaseous fuel has been used principally, other types such as pulverized coal, fuel oil and tar have been utilized (The Making, Shaping and Treating of Steel, 5th edition, Camp and Francis, page 383). Single-jet burners delivering a mixture of steam and atomized oil have been employed heretofore for firing open-hearth furnaces with fuel oil. These burners produced diverging flames which effected melting of the scrap in the furnace at a relatively slow rate from the exterior only, of the pile. The conventional single-jet oil burner used almost universally in open-hearth furnaces is designed so that the fuel required for working the steel will enter the combustion chamber above the bath of steel at a speed such as to make the flame nearly reach the outgoing end of the furnace, with the flame covering the bath, when the combustion chamber is entirely free and open with nothing in the combustion space to obstruct the combustion of the fuel.

At melt-down the combustion chamber is nearly filled with scrap and at this stage, with the single-jet burner a high rate of fuel consumption is resorted to for the purpose of melting down quickly. Since the combustion space is obstructed by the scrap the efficiency of combustion is low. Combustion occurs in the short space between the end of the burner and the face of the scrap piled in the furnace and also in the restricted space between the lining of the furnace and the pile of scrap. On account of the short space between the burner and the scrap the fuel does not arrive at complete combustion before reaching the scrap. This causes the fuel to burn in contact with the brick, transfers an excessive amount of heat to the roof, front walls and back walls, and melts the scrap down from the outside which is a slow process accompanied by excessive erosion of the lining of the furnace.

Because of the high speed of the fuel and steam entering the combustion chamber from the single-jet burner, a heavy induction force is set up on the firing end of the furnace after scrap is melted which draws in cold air through the wickets of the charging doors on the firing end of the furnace and all other openings around the doors, etc. This is undesirable because the cold air rushing through these openings blows the heat toward the back of the furnace. This is injurious to the roof and causes the steel to cool near the doors. Blowing the heat to the back of the furnace causes the heat lines at the back and more especially on the roof at the back of the combustion chamber to be more dense than on the roof at the front. This in-rush of air at the wickets on the firing end causing concentration of heat at the back of the roof from end to end of the combustion chamber overheats the roof along the back and causes it to wear or burn out along the back. This happens in the case of the single-jet burner even when the pressure in the combustion chamber is held at .05" to .06 of an inch of water, measured at the geographic center of the roof.

In addition to the aforementioned objectionable conditions resulting from the use of known burners to fire open-hearth furnaces with fuel oil, it has not been possible to change the character of the flame from the burner to adapt the flame to the successive stages of the steel-making operation because, with the burners used heretofore, any such change required the laborious adjustment of heavy air valves and disrupted the entire setting of the furnace.

I have invented a novel burner for heating an open-hearth furnace charge whereby I am able to effect rapid melting of the scrap in the furnace, and modification of the flame to adapt the flame to the successive stages of operation subsequent to the melting. In a preferred embodiment of the invention, I provide a burner firing a plurality of spaced, converging jets of a combustible such as a steam-oil mixture at relatively low velocity, and a central jet of compressed air at higher velocity adapted to produce an inductive effect upon the combustible jets, preventing too much spreading of the flame whereby a highly oxidizing, cutting or penetrating flame results which is effective to melt the scrap quickly. I also provide a simple and efficient burner capable of producing thorough atomization of steam and oil and adapted to deliver the converging combustible jets and the central air jet in such manner that a highly oxidizing cone down the center of the resulting composite flame impinges on a limited area of the surface of the scrap and thereby expedites the melting thereof. In addition to shortening the time required to melt the scrap, my invention produces more even distribution of the heat over the furnace roof during the working period, thereby eliminating localized concentration of heat along the back of the furnace roof and thus reducing the rate of roof deterioration.

The construction of my burner is such that the speed of the fuel is reduced so that it has time to arrive at complete combustion before reaching the scrap. This condition is further enhanced by the introduction of high-pressure air centrally of a plurality of fuel jets, thus furnishing air for quick ignition and combustion of the fuel concentrated down the center of the flame.

Other advantages and novel features of the invention will be pointed out in greater detail during the following complete description and explanation which refer to the accompanying drawings. In the drawings, Figure 1 is a partial longitudinal section through an open hearth furnace showing the application of my burner thereto;

Figures 2A and 2B constitute a side elevation showing the burner to enlarged scale;

Figure 3 is a view partly in end elevation and partly in section along the line III—III of Figure 2B;

Figure 4 is an end view taken from the left in Figure 2A;

Figures 5, 6 and 7 are transverse sections along the planes of lines V—V, VI—VI and VII—VII, respectively, of Figures 2A and 2B.

Figure 8 is a partial section similar to Figure 1, showing bath after scrap is melted;

Figure 9 is a cross section, somewhat diagrammatic, of the flame produced by the burner when adjusted for melting down a charge as shown in Figure 1; and Figure 10 is a diagrammatic plan view showing the distribution of the flame over the bath during the working of the heat as shown in Figure 8.

Referring in detail to the drawings and, for the present, to Figure 1, my novel burner indicated generally at 10 is mounted in the fuel port 11 of an open-hearth furnace 12 having a bottom 13, roof 14, air inlet port 15 communicating with air uptakes 15a, and charging doors 16. The burner may be supported in the port 11 by any suitable means (not shown) and has connections to suitable sources of a combustible mixture such as steam and oil, and an air compressor. As indicated in the drawing, the burner is positioned to deliver a concentrated cone of highly oxidizing flame 17 in center of composite flame 41, Fig. 9, impinging on a relatively small area of the surface of a pile of scrap 18 built up on the bottom 13, and on top of the limestone, if any, forming part of the charge.

As best shown in Figures 2A and 2B, the burner 10 comprises a hollow cylindrical body 20. It may conveniently be formed from a length of pipe threaded at its ends to receive couplings 21 and 22. A plug 23 is threaded into the coupling 21 and closes the forward end of the burner body. The plug 23 has a central air port or nozzle 24 and converging ports or nozzles 25 spaced circumferentially thereof adapted to deliver jets of a combustible mixture such as steam and atomized oil. The inclination of the nozzles 25 is such that their axes intersect the axis of the nozzle 24 substantially at the point where the jets from the several nozzles impinge on the scrap piled in the furnace. The nozzles are of such length and diameter as to produce well defined, substantially linear jets of fluid when the latter is supplied thereto under suitable pressure. A water-cooling jacket 23a surrounds the forward end of the burner; and has suitable connections to a source of cooling water and to a drain, respectively.

Compressed air is supplied to the nozzle 24 through an air tube 26 extending axially through the body 20 of the burner and having a nipple 27 welded to the extreme end thereof and threaded into the plug 23. The tube 26 extends through a plug 28 threaded into the coupling 22 and is connected to a suitable source of air under substantial pressure, e. g., 60–80# per square inch. The plug 28 is adapted to receive a packing gland 29 in its outer end and is provided with studs 30 whereby the gland may be drawn home around the air tube 26.

A combustible supply pipe 31 intersects the body 20 tangentially and at an acute angle to the projection of the axis of the body whereby steam and atomized oil delivered through the pipe 31 to the body are caused to travel forward therealong while circling about interiorly thereof. This insures thorough agitation and completes the mixing of the steam and oil and the atomization of the latter. The initial mixing of the steam and oil and partial atomization of the latter may be effected by any suitable means such as a simple form of steam-jet injector 31a.

The air tube 26 is connected to an air compressor through a T 32 and pipe 32a. A gate valve 33 is fitted on the tube beyond the T. On opening the valve, a clean-out rod may be inserted through the tube to remove any obstruction such as fly-ash which may accumulate in the nozzle 24 when the burner in the opposite end of the furnace is being fired. Clean-out pipes 34 for the nozzles 25 are threaded into the plug 28, and have gate valves 35 at their rear ends. Frusto-conical guide rings 36 are secured to the interior of the body 20 in line with the two upper pipes 34 and nozzles 25. These nozzles may thus be cleared by a clean-out rod in the same manner as the air nozzle 24. It will be understood that the valves 33 and 35 are closed at all times except when cleaning out the nozzles. The pipes 34 and tube 26 pass through spacer plates 37. Bracing stays 38 are welded to the plates 37 and to the pipe 31.

Having described the structure of the burner, I shall now explain the manner of using it.

When the scrap has been completely charged through the doors 16, I supply a combustible mixture such as steam and oil through the pipe 31 and compressed air through tube 26 in such manner that on ignition, a cutting flame 41 of oxidizing character is projected from the burner onto the scrap pile, with a central cutting cone indicated in the drawing at 17. The combustible mixture is supplied through the nozzles 25 which are of such number and size that the resulting speed of flow of combustible will permit combustion thereof to be substantially complete before striking the scrap pile. This is aided by the use of a plurality of converging fuel nozzles. The flame is therefore hottest just at the point of contact with the scrap. The short sharp, i. e., highly oxidizing flame thus produced is desirable on melt-down because the scrap is piled high in the furnace and the distance from the burner to the surface of the pile is short. The tangential relation of the fuel pipe to the interior of the burner body produces a swirling action around the tube 26 as the steam-oil mixture advances. This improves the atomization by collision of the particles and friction between the mixture and the wall of the body. This relation also causes the mixture to traverse the longest possible path between the inlet pipe and nozzles without any complex structure such as guiding waves or fins.

The air is delivered under sufficient pressure to impart to the jet discharged from the nozzle 24 a velocity somewhat greater than that of the jets of combustible, whereby the air stream by induction draws the combustible radially inward of the flame, thereby preventing spreading or diffusion and produces a cutting flame. My invention thus differs from prior burners which utilized the inflow of fuel to induce the air for combustion, in that my burner projects a jet of high-pressure air centrally of the conveying jets of fuel thereby inducing the latter radially inward toward the centerline of the air jet. The convergence of the equally spaced fuel nozzles causes the composite stream of fuel to be more dense along the common centerline, which is illustrated in Figure 9, in which the highly condensed fuel is designated 40 and the less condensed fuel around the outside surface of the composite flame is designated 41. As there shown, the air from jet 24 mixes with the concentrated fuel to form a well-defined highly oxidizing cone of flame 40, which is also shown in Figure 1 at 17. The method of adjusting the air and combustible supply will be explained later. The air supplied through the nozzle 24 affords the primary air for combustion of the fuel. The central nozzle 24 actually delivers an excess of primary air above the amount required for combustion and the surplus serves to oxidize the heated charge on contact therewith. At the same time secondary air is supplied through the air inlet port 15. Because of the highly oxidizing character of the cone of flame in the center of the composite flame impinging on a small area of the scrap pile, a hole is burned into the scrap pile through which fuel enters the interior of the pile and traverses the crevices between the pieces of scrap making up the pile and burns in these crevices by surface combustion, thereby inducing rapid melting. In fact, the melting is so rapid that scrap charged into one end of the furnace is melted, while the other end is being charged. On reversal of the firing direction, more scrap can be charged into the first or melted end and so on until the entire scrap charge is placed in the furnace without interruption of the operation of the charging machine.

The arrangement of the nozzles 24 and 25 produces the maximum surface contact between air and combustible, resulting in quick ignition during the melting stage. This is caused by the location of the high-pressure, high-velocity air stream centrally of the slower, converging streams of combustible. The nozzle arrangement also makes it possible to vary the burner flame for the various stages of the operation such as melt-down, working and holding. For melting, the air pressure should be about 20 pounds per square inch measured at the inlet end of the burner; for working 5 pounds; holding zero air pressure.

In addition to concentrating the flame, the air jet from nozzle 24 (the oxygen of which is eventually all consumed in the combustion of oil) supplies excessive air for combustion of the dense central fuel, making up the aforesaid central cone of flame and also serves to remove the melted scrap progressively from the point where the cone of flame impinges on the scrap pile. As the scrap melts, the molten metal is blown aside by the compressed air, exposing fresh surfaces of the piled scrap to the action of the burner flame. This progressive erosion of the surface of the pile quickly results in the formation of a hole in the pile into which the fuel extends, and burns by surface combustion.

As the melting of the scrap proceeds in the manner indicated above, I increase the fuel from the nozzles 25, thereby delivering a longer flame adapted to enter the hole formed in the pile by the initial melting and erosion of the surface thereof. The fuel discharged into the hole eroded in the pile blows through the pile, traversing the crevices between the adjacent masses of metal therein, and burns by surface combustion. This heats the pile throughout from the interior thereof with the result that the melting, when once initiated, proceeds rapidly to completion with the accumulation of a bath of molten metal on the bottom 13. Since the piled scrap is thus heated from the interior, overheating of the roof during melt-down is avoided.

After the scrap has been wholly melted, I modify the flame produced by my burner, to adapt it to the succeeding stage of the operation of the furnace. I reduce the pressure of the air supplied through tube 26 causing the burner to deliver a soft, hot flame which is neutral or non-oxidizing. Such flame is well adapted for the working of the charge after the addition of the molten pig iron. Under these conditions, the air entering the inlet 15 furnishes the greater portion of the oxygen needed for combustion. The approximate shape of the working flame is shown in Figure 8. The two upper nozzles 25 produce jets striking the surface of the slag layer on the bath at a small angle while the lower nozzle discharges a jet at a greater angle. The latter is deflected and the rebound causes the other jets to rise slightly above the surface, but they in turn prevent the lower jet from rebounding further up to the roof. This produces a concentration of the heat on the bath and transfers a greater amount of the heat to the bath and in consequence, less heat to the roof of the furnace. In fact, the temperature of the furnace roof when using my burner is less than when using other burners by 60° to 100°. The greater transfer of heat to the bath shortens the working time necessary to produce steel. As a consequence the distribution of the flame over the bath during the working stage is shown in Figure 10.

Because of the excessive velocity of the fuel-steam mixture from the single jet burner universally used, a great inductive force is caused in the firing end of the furnace, which results in an inrush of cold air through the wickets and other openings on the firing end of the furnace, during the working stage. Since in my burner the speed of the steam-fuel mixture is greatly reduced in comparison with the speed from the single jet burner, and the air pressure during the working stage is reduced, this inductive force is decreased to a degree such that at all wickets and openings on the firing end a positive pressure exists. Also, on account of the reduction in speed of the steam, fuel and air a positive pressure is set up in the outgoing end of the furnace, but this pressure is much less than in the case of the single jet burner. This all results in a more uniform pressure throughout the combustion chamber and eliminates any inrush of cold air at any opening, and in this way avoids freezing of the bath along the front, (which sometimes happened in the case of burners previously used) and also eliminates the blowing of heat blasts to the back of the furnace concentrating heat along the back line of the roof. As shown, the flame from my burner has contact with the bath nearly to the shore line 42 thereof at the end at which the burner is being fired, thereby overcoming any tendency to cool in that vicinity. Ordinary burners cause the flame to be deflected away from the bath so that it tends to cool and even to freeze slightly along the edges. As a result, furnaces equipped with my burner are able to average three heats per day for several days in succession, instead of only occasionally as in the case of furnaces having previously known burners. For the working of the charge, the valves controlling the air entering the inlet port 15 are adjusted to give 2% excess oxygen in the stack gases when the maximum amount of fuel needed for working the charge is being supplied to the burner 10, the waste gas sample being taken after the scrap has been melted, the pig iron added, the bath is entirely covered by the slag, and the adjustment of the usual checker valves perfected. Even with the reduced velocity of the air jet, it is still effective to concentrate the burner flame on the bath, thereby tending to prevent overheating of the roof.

With the valves controlling the air entering the inlet 15 adjusted as just described, the desired melting flame will result if the pressure on the air supplied to nozzle 24 is raised to 20#/sq. in. measured at the burner.

I may further modify the flame after the charge has been fully worked, and convert it to a holding flame, if desired. I accomplish this by cutting off all compressed air and maintaining the supply of combustible delivered by the nozzles 25. The combustible is partially burned with the oxygen of the air entering the inlet port 15, producing a yellow, highly reducing flame or even a smoky flame which is slightly carburizing and therefore well suited for holding the charge at tapping heat. This holding flame will not burn the brick work.

In a particular instance, I have found that a good working flame may be obtained if the air supplied to the tube 26 is under a pressure of 5#/sq. in. measured at burner. For the holding flame, the fuel should be reduced so that as little unburned combustible as possible passes out of the stack end of the furnace, while holding up the temperature of the bath.

It will be apparent that my invention is characterized by numerous important advantages over prior burners for heating open-hearth furnace charges. The principal advantage is the reduction in the time required to melt the scrap and the reduction in the time required to raise the temperature of the steel and cause a rapid succession of events, such as scrap boil, lime boil, etc. This is reflected in a reduction of the total time required to make a heat of steel. In a particular operation, including a large number of heavy charges, the time required to melt the scrap by my invention was less by more than an hour, on the average, than the time formerly required. This reduction in melting time and working time has a direct relation to the output of steel per hour, the increase being actually 1.5 tons per hour in the example mentioned, as well as materially reducing the fuel consumption, and the cost of brick per ton of production.

The burner of my invention is designed to deliver the fuel necessary for melt-down but breaks it up into three (or more) jets by a plurality of nozzles whose combined area is greater than the area of the nozzle of the conventional single-jet burner. The combined area of the plurality of nozzles is great enough to introduce the fuel at a speed low enough to allow the fuel to arrive at complete or nearly complete combustion in the space between the end of the burner and the pile of scrap, so that it is at highest flame temperature when it reaches the face of the scrap pile nearest to the burner. The high flame temperature of the three (or more) jets of fuel is enhanced by the slower speed and by the greater surface of fuel presented to the preheated air for combustion. The fast melting ability of this high-temperature flame is further enhanced by introducing a jet of high-pressure air down the center of the composite flame from the three (or more) fuel jets. This causes a sting or cone of very highly oxidizing flame following the air jet down the center of the three (or more) jets.

The ability to modify the character of the flame discharged by the burner, to adapt the flame to the several stages of the entire operation such as scrap melting, working, and holding, by means within the burner itself is, of course, an important advantage, particularly since it does not disturb the general setting of the furnace nor involve adjustment of the main air valves controlling the flow of in-going air through the regenerator checkers, the uptake and inlet port into the furnace. All that is necessary to vary the character of the flame is the proper adjustment of the amount of high-pressure air supplied to my burner. This may be accomplished by the use of small valves which may be easily operated by hand.

The burner itself, furthermore, is effective, as pointed out above, to produce thorough mixture of the steam and fuel and atomization of the latter (oil or tar) by the steam with which it is entrained, thereby increasing the efficiency and completeness of combustion when mixed with the primary and secondary air in the neighborhood of the nozzle end of the burner.

Although I have described and illustrated only a preferred embodiment of my invention, it will be understood that changes in the details of construction disclosed herein may be made without departing from the spirit of the invention or the scope of the appended claims.

I claim:

1. A burner for liquid fuel comprising a length of pipe forming a body for the burner, a fuel-supply tube intersecting said pipe tangentially adjacent its rear end and at an acute angle to the projection of the axis of the pipe, a closure at the discharge end of the pipe having a central air discharge port and fuel discharge ports spaced radially thereof, a closure on the other end of the pipe, and an air tube extending through the last-mentioned closure and axially of said pipe to said air port.

2. A burner for liquid fuel comprising a length of pipe forming a body for the burner, a fuel-supply tube intersecting said pipe, a closure at the discharge end of the pipe having a central air discharge port and fuel discharge ports spaced radially thereof, a closure on the other end of the pipe, an air tube extending through the last-mentioned closure and axially of said pipe to said air port, pipes extending from said last-mentioned closure in alinement with said fuel ports, adapted to admit a clean-out rod, and valves on said last-mentioned pipes.

3. The burner defined by claim 2 characterized by rod guides in said body intermediate said closures and in alinement with said fuel ports.

GUY J. MORGAN.

REFERENCES CITED

The following references are of record in the file of this patent:

UNITED STATES PATENTS

| Number | Name | Date |
|---|---|---|
| Re. 15,598 | Jacobson et al. | May 15, 1923 |
| 218,619 | Dexter | Aug. 19, 1879 |
| 372,687 | Lewis | Nov. 8, 1887 |
| 378,326 | Lewis | Feb. 21, 1888 |
| 423,012 | Wilson et al. | Mar. 11, 1890 |
| 1,251,839 | Teed | Jan. 1, 1918 |
| 1,265,172 | Caracristi et al. | May 7, 1918 |
| 1,311,575 | Palmer et al. | July 29, 1919 |
| 1,448,106 | Binks | Mar. 13, 1923 |
| 1,647,956 | Butcher | Nov. 1, 1927 |
| 1,685,967 | Sullivan | Oct. 2, 1928 |
| 1,695,334 | Johnston | Dec. 18, 1928 |
| 1,700,269 | Loepsinger | Jan. 29, 1929 |
| 1,783,818 | Werner | Dec. 2, 1930 |
| 1,891,314 | Miller | Dec. 20, 1932 |
| 1,964,942 | Hallgarth | July 3, 1934 |
| 2,182,497 | Longenecker | Dec. 5, 1939 |
| 2,182,498 | Longenecker | Dec. 5, 1939 |
| 2,342,228 | Treat | Feb. 22, 1944 |